Dec. 24, 1946.          E. PORTER                2,413,154
                      TRUNK-PISTON BODY
            Filed Oct. 30, 1944          2 Sheets-Sheet 1
FIG. 1.              FIG. 2.              FIG. 3.
 COLD         OPERATING TEMPERATURE CONDITIONS
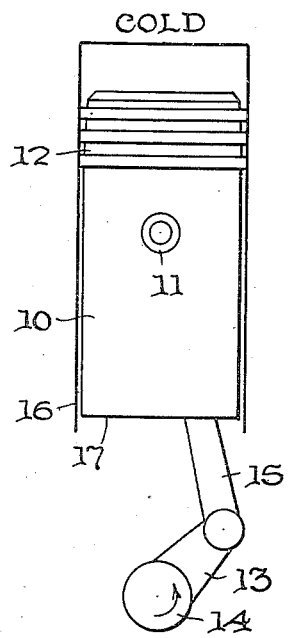
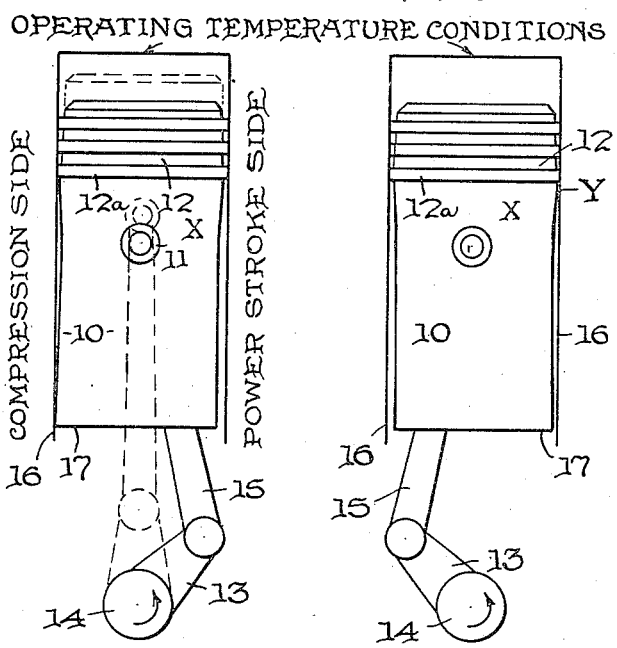
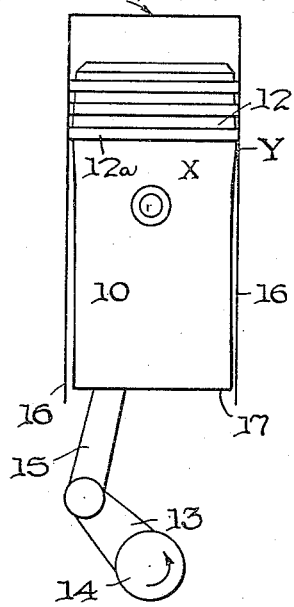
FIG. 4.              FIG. 5.              FIG. 6.
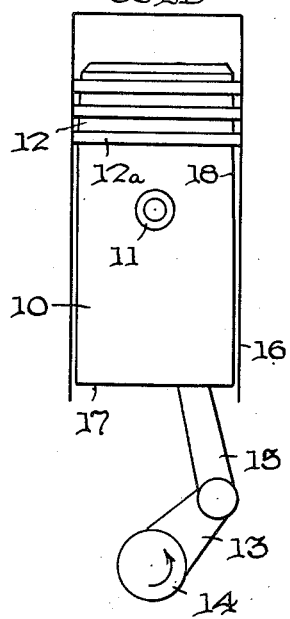
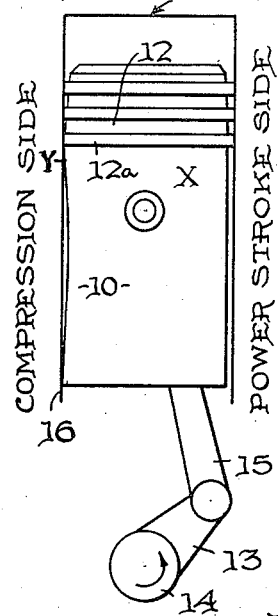
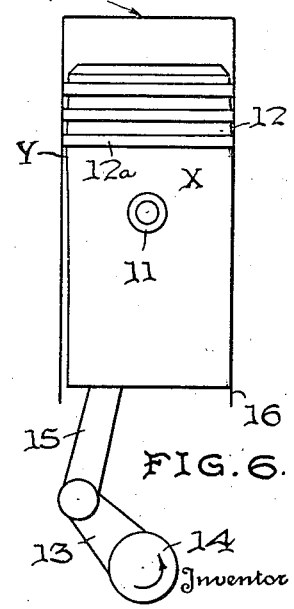
Inventor
EDWARD PORTER
Attorney Dec. 24, 1946.    E. PORTER    2,413,154
TRUNK-PISTON BODY
Filed Oct. 30, 1944    2 Sheets-Sheet 2

Inventor
EDWARD PORTER

Patented Dec. 24, 1946

2,413,154

UNITED STATES PATENT OFFICE 2,413,154

TRUNK-PISTON BODY

Edward Porter, Bradenton, Fla.

Application October 30, 1944, Serial No. 561,034

6 Claims. (Cl. 309—11)

The present invention pertains to piston-bodies of the trunk-type and relates particularly to a novel design for such piston-bodies and the method of obtaining the same.

In internal combustion engines there are three principal moving parts—namely, piston, connecting rod and the crank shaft—whereby the reciprocatory motion of the piston is converted into a rotary motion. These three moving parts, due to their unavoidable disposition and relationship, set up noises and vibrations, especially in the larger type of engines, particularly the Diesel engines (but to a greater or lesser degree in all engines), which are not of the cross-head type.

In the cross-head type of engine, the cross-head takes up lateral thrust of the connecting rod (between the cross-head and crank) during the rotation of the crank shaft and therefore eliminates or greatly minimizes the effects of the lateral shifting of the relatively shorter piston-body during its reciprocatory movements; and, thus, in a measure said cross-head type engines do not develop the objectionable noises and vibrations which the present invention is principally designed to overcome.

Consequently, the present invention is adapted particularly to the non-cross head type of internal combustion engine of the industrial and heavy duty type where the piston-body—having a relatively greater length below the piston-ring area and due to the clearance normally provided to prevent binding or "freezing"—shifts laterally from one side of the cylinder to the other on its compression and power-strokes, respectively, during the angular shifting of the connecting rod and crank about the axis of the crank shaft and the pressure exerted upon the top piston, and produces objectional noises and vibrations. These objectionable noises are the result of the vibration and/or the lateral shifting of the piston from side to side in its cylinder, and these vibrations and piston shifting are harmful in that they produce undue fatigue of the crank-pin bearing as well as in the bearing metal and, also, tends to loosen the piston wrist-pin or to hammer out the wrist-pin bearings. However, another factor enters into the situation which produces such objectionable vibrations and noises.

This factor, just stated, is emphasized in non-crosshead type engines where the piston is usually of much greater length and weight than in other types of engines such as crosshead type engines—because, when the engine reaches operating temperature, the piston expansion is greatest at the top of the piston body than at its lower or bottom end portion. The expansion at the top of piston forms an outward "bulge" for distance downwardly and then, tapers off toward the bottom of the piston. This is due to the well-known fact that the top of the piston body is exposed to the intense heat of combustion while the lower end portion is exposed to much lower temperatures of the crank case and, also, to the coolest part of the cylinder. The result of this expansion is that the piston does not present a straight line surface to the surface of the cylinder wall and, when the piston-body shifts laterally as above stated, particularly on its downward or power-stroke, a very small surface of the piston wall—at the crest of the "bulge"—strikes a hammer-like blow on the opposing cylinder wall. This hammering blow, occurring on each power-stroke of the piston—in some engines many hundred times per minute—not only sets up objectionable noises but causes a continuing detrimental vibration through the entire engine structure, and which more particularly are detrimental to the crank-pin bearings and bearing linings and to the wrist-pin and wrist-pin bearings, thus resulting in early deterioration and the necessity for replacement.

The object of the present invention is to overcome these objectionable noises and vibrations in a very simple and effective manner, thus producing a much quieter running engine with a minimum of vibrations resulting in increasing the life several fold of the crank-pin bearings and wrist-pin bearings.

In the accompanying drawings, the problem encountered is illustrated as well as the solution to the problem which forms my present invention or discovery, and in which:

Figure 1 is a diagrammatic view of an engine cylinder and piston as generally manufactured and shows the relation of the piston in the cylinder, in a somewhat exaggerated form, when it is cold or not in operation;

Figure 2 diagrammatically illustrates the position of the piston-body and cylinder as shown in Fig. 1, after the engine has developed its operating temperature and while the piston is in its upward or compression-stroke;

Figure 3 diagrammatically illustrates the position of the piston relative to the cylinder walls, after the engine has developed its operating temperature, and while the piston is in its downward or power-stroke;

Figure 4 illustrates a piston made in accordance with my invention and its relation to the cylinder wall while the engine is cool and inoperative;

Figure 5 illustrates the position of the piston made in accordance with my invention and while it is in its upward or compression-stroke, the engine having developed its operating temperature;

Figure 6 illustrates a piston made in accordance with my invention and its relation to the cylinder wall and while in its downward or power-stroke, after the engine has developed its operating temperature;

Figure 7:
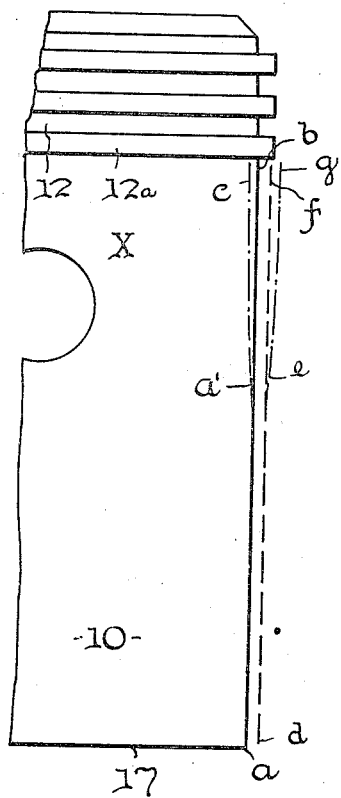
Figure 7 is an enlarged diagrammatic view illustrating a manner of practicing the present invention.

As shown in Figure 1, the ordinary and usual trunk-piston 10 for non-cross-head engines, particularly of the larger industrial or heavy duty sizes, are made relatively long and the wrist-pin bearing openings 11 are usually positioned on diagrammatically opposite sides of the piston-body at a distance below the piston-ring area 12. The piston-body extends below the wrist-pin openings for a distance substantially equal to that above the wrist-pin openings. This is not always the case, due to particular makes of pistons, but it is substantially so in most cases. The piston body is cylindrical throughout (i. e., on same radius) to the groove piston-ring area 12 and, therefore, parallel with the walls of the cylinder. Also, the lower end of the piston body or skirt may or may not be provided with wiper ring or rings. The outer surface of the piston-ring area 12 is reduced in diameter so as to avoid jamming or binding of the rings during engine operation. This is the usual practice in the manufacture of pistons in order to give sufficient clearance to the ring spacer area so that they will not contact the cylinder walls when the piston has reached its full operating temperature, and, hence, expanded to its limit. The reduced ring area 12 often is frusto-conical, as shown, with the edge of the top of the piston bevelled. For a given size cylinder, the diameter of the piston below the lower piston ring 12a is such as to provide suitable clearance— usually in the order of one thousandth inch (.001) per inch for each inch of diameter of the piston— for the purpose of providing for the expansion of the piston, when it has reached its operating temperature, as well as providing for the oil film between the side walls of the piston and the cylinder.

When the engine is in operation and has reached its operating temperature, the piston body expands radially. As shown in Figs. 2 and 3, this radial expansion is greatest at the top of the piston than at its bottom or skirt end, because the upper portion of the piston is subjected to the high temperatures of combustion while the lower or skirt portion of the piston (usually from about the wrist-pin openings downward) is farther away from the combustion gases and the heat is dissipated therefrom more rapidly. In liquid cooled systems, in particular, the lower portion of the cylinder is always the coolest area, which plus the other adjacent cooling influences of the engine, reduce the tendency of the lower portion of the piston to expand radially as much as the upper portions and cause a more uniform expansion in said lower portion. Therefore, as shown in Figs. 1, 2 and 3, the upper portion of the piston, i. e., the area approximately indicated at "X," has its side walls expanded radially outward at a much greater degree (as indicated by the line $e$—$g$, Fig. 7) than the side walls of the lower portion of the piston body (as indicated by the line $d$—$e$, Fig. 7) which latter indicates a substantially uniform expansion. The piston-ring area 12 will of course expand radially, but due to the fact that this surface has been relieved by machining to produce a reduced diameter, for the reasons above stated, the radial expansion in this area of the piston will not be sufficient to cause the piston ring spacer surfaces to at any time contact the walls of the cylinder. The result is— that the circumferential area of the piston body at a point from about the wrist-pin openings to the lower piston ring 12a is radially expanded with a lateral circumferential bulge, producing what might be termed a "heat expansion curve surface," extending longitudinally of the piston.

As shown in Fig. 2, when the engine has developed its operating temperature and the piston is on its upward or compression-stroke, the thrust of the crank arm 13 on shaft 14 is transmitted through the connecting-rod 15 to the piston-body 10, at an oblique angle, and causes the expanded area "X" on the left-hand side of Fig. 2 to contact the cylinder wall 16. As the piston progresses upwardly toward the end of its compression-stroke the angle of thrust from the crank-arm 13 decreases until dead center is reached and the crank-arm 13 and connecting-rod 15 are in the dotted line position. At which time, the compression is at its highest point and at substantially about the time, or a little before, the ignition takes place to produce the downward movement or power-stroke of the piston, causing the piston to shift laterally to the right, as shown in Fig. 3, against the power-stroke side of the cylinder. It will be noted from Fig. 2 that the power-stroke side of the piston has been held out of contact with the cylinder due to the clearance provided, in normal manufacture, and that one side of the piston (what I call the "compression-stroke side") has been forced against the opposing wall of the cylinder 16.

Now, as the piston starts in its downward or power-stroke, as indicated in Fig. 3, the angle of the connecting rod is shifted slightly past the dead center and the firing pressure in the combustion chamber of the cylinder acting upon the top of the piston causes the piston to shift laterally and the point of greatest expansion, i. e., crest of the bulge, as at Y, to hit the cylinder wall with a hammer-like blow. This blow coupled with the combustion chamber pressure acts upon the piston head and transmits a great shock and vibration to the wrist-pins and the crank-bearing upon each firing stroke of the engine. This vibration or hammering of the piston against the side walls of the cylinder causes early fatigue of parts and early deterioration of the wrist-pins and crank-pin bearings.

I have discovered that in inflexible and rigid piston-bodies, if the surface of area on the power-stroke side of the piston, as normally manufactured and described in connection with Fig. 1 hereof, is of less radii to the extent that said surface will not expand radially in excess of the radial expansion in the lower position of the piston, I am able to produce a piston-body which, when fully expanded under operation conditions, will have a wall, from the piston-ring area 12 to the bottom 17 of the piston-body 10, that is parallel, or practically so, with opposing side wall of the cylinder, thus reducing to a minimum the harmful deteriorating vibrations which have such a deteriorating effect on the wrist-pin and crank-pin bearings.

Figure 8:
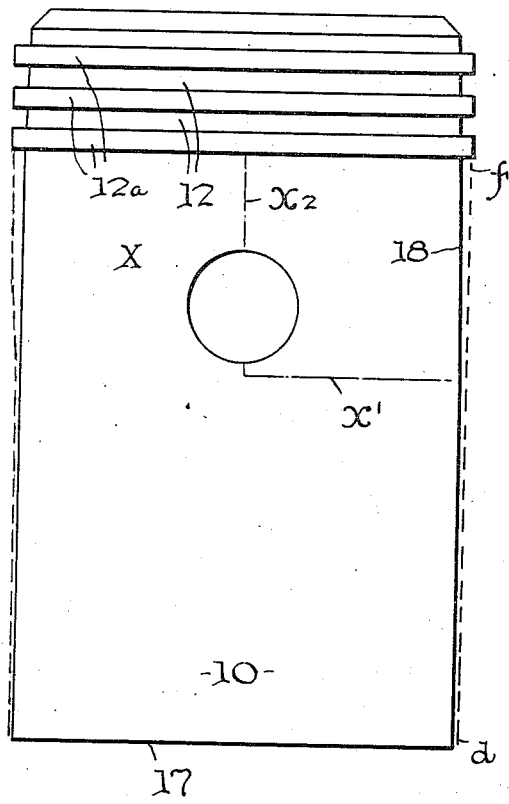
Figure 8 is an enlarged view of a piston made in accordance with my invention, the dotted lines showing an assumed expansion (exaggerated) of a given piston for a given type of engine of a certain speed, firing pressures and cooling water temperature.
Figure 9:
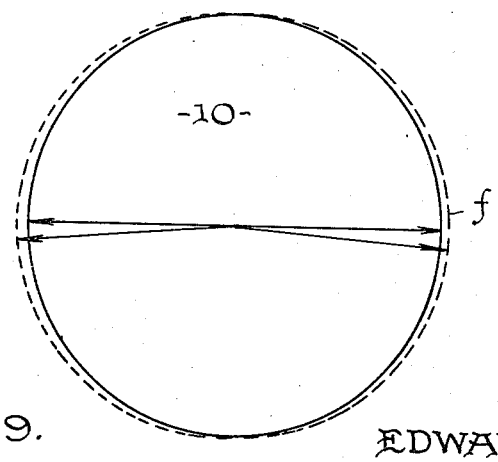
Figure 9 is a top plan view of Fig. 8.

In other words, and with particular reference to Fig. 8, I remove from approximately one-half (180 degrees) of the area X on the power-stroke side of the piston-body (as shown by the dot and dash line $x'$ and $x^2$, Fig. 8) by machining, horning, grinding or scraping, the metal between the line $a'$—$b$ and the line $a'$—$c$ of Fig. 7. Consequently, in my finished piston, when cold, the power-stroke side half of the piston wall surface will have an inclined portion 18 extending inwardly and upwardly from approximately the line $x'$ (Fig. 8) to the lower piston-ring 12$^a$ with the remainder of the piston-body below the piston-rings 12$^a$ being cylindrical and, otherwise, the walls of the piston and its skirt, as a whole, being preferably solid and continuous, except for piston ring grooves, that is, devoid of slots, openings or slits extending through said walls. The amount or degree of the inclination or surface removal will be proportionate to the excess expansion indicated by line $e$—$f$ and line $e$—$g$, Fig. 7.

In Fig. 7, line $a$—$b$ indicates the cylindrical surface of a piston body as shown in Fig. 1. Line $d$—$e$—$g$ represents (exaggeratedly) the approximate expansion of the cylindrical surface of the piston shown in Fig. 1, when under operating conditions. Line $d$—$e$—$f$ represents (exaggeratedly), the expansion of said cylindrical surface of the piston, if the metal of said surface ($a$—$b$) were removed between line $a'$—$b$ and line $a'$—$c$ in an amount proportional as will not produce the excess expansion indicated by lines $e$—$g$ and $e$—$f$. It, therefore follows that, when the piston shown in Fig. 8 is installed and reaches operating temperatures, hence fully expanded, the power-stroke side of the wall of the piston will assume, for practical purposes, a straight line position indicated by the line $d$—$f$ in Fig. 8 or by line $d$—$e$—$f$ in Fig. 7. At any rate, removing the metal as above indicated, eliminates the pronounced projecting or bulging area X on the power-stroke side of the piston which acts as a hammer of very small area (as compared to the entire side of the piston) which strikes the piston wall.

In determining the amount of metal to be so removed, as above stated, this must be done with respect to each piston for each type of engine and is a relatively simple matter for engineers or those skilled in the art. The amount of expansion in the area X of any piston is dependent upon the firing pressures and the type of cooling system employed. In the removal of the metal, above specified, the work is to be done so that the edges of the surface indicated by lines $x'$—$x^2$ will gradually merge with a tapered or feathered surface so that there will be no sharp or uneven edges on the piston surface, all of which is understood by those skilled in the art. While I, in most cases, prefer to reduce the radius of the piston only on its power-stroke side, as described above, it is fully within my invention to reduce the entire circumference of the area X (360°) so as to permit the position of the piston to be turned 180° in the cylinder, when desired, as is understood in the art.

When the compression-stroke side of the piston-body is left straight, when cold, the excess expansion on the compression-stroke side, which produces the bulge Y, when at normal running temperatures, does not cause any detrimental vibration but has the advantage of tipping the piston-body toward the power-stroke side of the cylinder, when the crank and connecting rods are in top dead center, and, combined with the pressure of compression and/or the firing pressure, exerts a lateral thrust on the piston to shift it against the power-stroke side of the cylinder while the crank and the connecting rods are at dead center or at a slight angle from dead center. While this lateral shifting ordinarily would take place in any event, at a later time when the angle of the crank and the connecting rod are greater from dead center, I find that the bulge Y on the compression-stroke side of the piston assists in shifting the piston sooner against the power-stroke side of the cylinder, which is beneficial to operation of the engine.

By practicing the above invention or discovery, I have found that the vibrations of engines are greatly reduced and that undue stresses are relieved from the wrist-pin and crank-pin bearings, thereby adding to the life of these parts and reducing the cost of maintenance; and also that the continuous objectionable noises incident to such vibrations or lateral shifting of the piston body in the cylinder have been either eliminated or reduced to a point where the engine operates smoothly and quietly, particularly in connection with industrial or heavy duty engines.

This invention will also reduce the possibility of scoring of the piston and cylinder as the power-stroke side of the piston will be uniform at running temperatures and conform to the surface of the power-stroke side of the cylinder.

Without definite knowledge of the reason for the results of this discovery I advance the theory that when the power-stroke side of the piston presents a surface to the power-stroke of the cylinder which is parallel with it (as represented by line $d$—$f$ in Figs. 7 and 8), the radial shifting of the piston (as occurs when the piston shifts from its position shown in Fig. 5 to the position shown in Fig. 6) is more definitely cushioned by the oil film between the surface and by the increased area of contact, thus eliminating the hammer-blow produced by the contact of the point Y with the cylinder surface, as indicated in Fig. 3, and, consequently, eliminating the severe shock and vibrations incident thereto which are detrimental to the longevity of the various operating parts and to the wrist-pin and crank-pin bearings in particular.

Having thus described the invention and the manner in which it is to be performed, it is to be understood that certain variations and modifications may be made from the specific instructions above given and which variations the modifications fall within the scope of the appended claims.

That which is claimed as new is:

1. A trunk-type piston having a cylindrical body with a reduced circumferentially-extending piston-ring area at its head end portion so as not to touch the cylinder walls when expanded under heat, the upper portion of the surface of the said cylindrical body below said ring area being reduced to less radii on the power-stroke side thereof, when cold, to an extent substantially proportionate to its radial expansion in excess of the radial expansion of the bottom portion thereof, when the piston-body is under its operating temperatures and pressures, whereby the body below said ring area on its power-stroke side will be a substantially straight line and conform to the opposing wall of the cylinder when radially expanded under operating temperatures.

2. An elongated trunk-type cylindrical piston-body having a head, a reduced piston-ring area adjacent said head and wrist-pin bearing openings therein below said area; the area of the body below said piston-rings being reduced progressively upward on the power-stroke side thereof, when cold, to an extent that its radial expansion is not in excess of the radial expansion of the bottom thereof when the piston is subjected to its operating temperature and pressure, whereby the area of the power-stroke side of the piston-body below said piston-rings will contact substantially uniformly with the opposing wall of its cylinder, when expanded under operating conditions, and reduces to a minimum the shock and thrust incident to the lateral shifting of the piston from the compression-stroke side to the power-stroke side of the cylinder under operating conditions.

3. A trunk-type piston having a cylindrical body with a reduced circumferentially-extending piston-ring area at its head end portion so as not to touch the cylinder walls when expanded under heat, the upper portion of the surface of the said cylindrical body below said ring area being reduced to less radii on the power-stroke side thereof, when cold, to an extent substantially proportionate to its radial expansion in excess of the radial expansion of the bottom portion thereof, when the piston-body is under its operating temperatures and pressures, the edges of the reduced area on the power-stroke side gradually tapering and merging into the adjacent surfaces of the piston-body to present a smooth surface except at the piston-ring area.

4. A trunk-type piston-body having a reduced circumferentially-extending piston-ring area at its head end portion so as not to touch the cylinder walls when expanded under heat, the remaining area of the piston-body being reduced progressively upward on the power-stroke side thereof, when cold, to an extent substantially proportionate to its radial expansion in excess of the radial expansion of the bottom portion thereof, when the piston-body is under its operating temperature and pressure, the compression-stroke side of said remaining area of the piston and below the piston-rings being of equal radii throughout when cold, the walls of the piston body being solid and continuous.

5. A trunk-type piston having a cylindrical body with a reduced circumferentialy-extending piston-ring area at its head end portion so as not to touch the cylinder walls when expanded under heat, wrist-pin bearing openings in diametrically opposite portions of said cylindrical body below said ring area, the upper portion of the surface of the said cylindrical body below said ring area being reduced to less radii on the power-stroke side thereof and on the compression-stroke side thereof, when cold, to an extent substantially proportionate to its radial expansion in excess of the radial expansion of the bottom portion thereof, when the piston-body is under its operating temperatures and pressures, the edges of the reduced area on the power-stroke side gradually tapering and merging into the adjacent surfaces of the piston-body at the wrist-pin bearing opening side portions thereof to present a smooth surface except at the piston-ring area, the walls of the piston-body being devoid of slots, openings or slits extending therethrough.

6. In a trunk-type piston for operation in an engine cylinder, said piston having a cylindrical body with a piston ring area at its head end portion, the exterior surface of the piston body on at least the power-stroke side being reduced, at normal non-operating temperatures, to an extent such that upon expanding, under engine operating conditions, the said surface on said power-stroke side below said piston rings will substantially conform with the adjacent surface of the cylinder wall, within which said piston operates, whereby to substantially reduce the shock incident to the thrust due to the lateral shifting of the piston in its cylinder and resulting in less noise and less vibration being transmitted to the crank shaft and bearings.

EDWARD PORTER.